(12) United States Patent
Liu et al.

(10) Patent No.: US 11,594,917 B2
(45) Date of Patent: *Feb. 28, 2023

(54) OVERVOLTAGE PROTECTION DEVICE AND METHOD THEREOF

(71) Applicant: NuVolta Technologies (Hefei) Co., Ltd., Hefei (CN)

(72) Inventors: Sichao Liu, Shanghai (CN); Jinbiao Huang, Nashua, NH (US)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 119 days.

This patent is subject to a terminal disclaimer.

(21) Appl. No.: 17/320,373

(22) Filed: May 14, 2021

(65) Prior Publication Data

US 2021/0273445 A1 Sep. 2, 2021

Related U.S. Application Data

(63) Continuation of application No. 16/134,353, filed on Sep. 18, 2018, now Pat. No. 11,075,515.

(60) Provisional application No. 62/680,638, filed on Jun. 5, 2018.

(51) Int. Cl.
*H02J 50/12* (2016.01)
*H02H 7/125* (2006.01)
*H02H 9/04* (2006.01)
*H02H 3/20* (2006.01)

(52) U.S. Cl.
CPC ............ *H02J 50/12* (2016.02); *H02H 7/1252* (2013.01); *H02H 3/20* (2013.01); *H02H 9/04* (2013.01)

(58) Field of Classification Search
CPC ........ H02J 50/10; H02J 50/12; H02J 7/00308; H02J 7/02; H02H 3/023; H02H 3/20; H02H 7/1252; H02H 9/04; H02M 1/32; H02M 7/06; H02M 7/062; H02M 7/066; H02M 7/2195
See application file for complete search history.

(56) References Cited

U.S. PATENT DOCUMENTS

| | | | |
|---|---|---|---|
| 9,847,668 B2 | 12/2017 | Kim et al. | |
| 10,020,849 B2 | 7/2018 | Mao et al. | |
| 10,454,312 B2 | 10/2019 | Mao et al. | |
| 11,075,515 B2* | 7/2021 | Liu | H02M 7/06 |
| 2012/0050931 A1 | 3/2012 | Terry et al. | |
| 2012/0153903 A1 | 6/2012 | Kim et al. | |
| 2012/0293009 A1 | 11/2012 | Kim et al. | |
| 2012/0293900 A1 | 11/2012 | Kim et al. | |
| 2013/0342026 A1* | 12/2013 | Mishina | H02J 50/12 307/104 |
| 2014/0327390 A1 | 11/2014 | Park et al. | |
| 2015/0008755 A1 | 1/2015 | Sone | |
| 2015/0035372 A1 | 2/2015 | Aioanei | |
| 2015/0280429 A1 | 10/2015 | Makita et al. | |

(Continued)

*Primary Examiner* — Fred E Finch, III
(74) *Attorney, Agent, or Firm* — Slater Matsil, LLP (57) ABSTRACT

A device includes a rectifier connected to a receiver coil, a first overvoltage protection apparatus connected between inputs of the rectifier and ground, and a second overvoltage protection apparatus connected between an output of the rectifier and ground, wherein in an overvoltage event, the first overvoltage protection apparatus and the second overvoltage protection apparatus are controlled based upon a comparison between a switching frequency of the device and a predetermine frequency threshold.

20 Claims, 6 Drawing Sheets

(56) References Cited

U.S. PATENT DOCUMENTS

| | | |
|---|---|---|
| 2016/0336816 A1 | 11/2016 | Mach et al. |
| 2017/0033612 A1 | 2/2017 | Su |
| 2017/0093225 A1 | 3/2017 | Murayama et al. |
| 2017/0187244 A1 | 6/2017 | Su |
| 2017/0271920 A1 | 9/2017 | Kim et al. |
| 2017/0346343 A1 | 11/2017 | Atasoy et al. |
| 2018/0048185 A1 | 2/2018 | Hwang et al. |
| 2018/0083487 A1 | 3/2018 | Nalbant |
| 2018/0131234 A1 | 5/2018 | Uchimoto |
| 2018/0198273 A1 | 7/2018 | Hwang et al. |
| 2018/0212469 A1 | 7/2018 | Liu et al. |
| 2018/0262002 A1 | 9/2018 | Tramoni |
| 2018/0323828 A1 | 11/2018 | Hwang et al. |
| 2019/0036381 A1 | 1/2019 | Hwang et al. |
| 2019/0260232 A1 | 8/2019 | Liu et al. |
| 2019/0305598 A1 | 10/2019 | Chen et al. |
| 2019/0356149 A1 | 11/2019 | Li et al. |
| 2019/0386517 A1 | 12/2019 | Liu et al. |
| 2020/0028358 A1 | 1/2020 | Ohtsu et al. |
| 2020/0112202 A1 | 4/2020 | Li et al. |
| 2020/0274402 A1 | 8/2020 | Hwang et al. |

\* cited by examiner

OVERVOLTAGE PROTECTION DEVICE AND METHOD THEREOF

CROSS REFERENCE TO RELATED APPLICATIONS

This application is a continuation of U.S. application Ser. No. 16/134,353, entitled "Overvoltage Protection Device and Method Thereof" and filed on Sep. 18, 2018, which claims priority to U.S. Provisional Application No. 62/680,638, entitled "Overvoltage Protection Device and Method Thereof" and filed on Jun. 5, 2018, each application is hereby incorporated herein by reference.

TECHNICAL FIELD

The present invention relates to an overvoltage protection device, and, in particular embodiments, to an overvoltage protection device in a receiver of a wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

An overvoltage event may occur in the receiver of the wireless power transfer system. The overvoltage event may be caused due to various reasons such as a dramatic operating frequency change, a coupling coefficient variation and the like. The overvoltage event may apply abnormal voltage stresses to the circuit of the receiver.

As the power of the wireless power transfer system goes higher, there may be a need for effectively protecting the receiver of the wireless power transfer system during an overvoltage event.

SUMMARY

These and other problems are generally solved or circumvented, and technical advantages are generally achieved, by preferred embodiments of the present disclosure which provide an overvoltage protection device in a receiver of a wireless power transfer system.

In accordance with an embodiment, a device comprises a rectifier connected to a receiver coil, a first overvoltage protection apparatus connected between inputs of the rectifier and ground, and a second overvoltage protection apparatus connected between an output of the rectifier and ground, wherein in an overvoltage event, the first overvoltage protection apparatus and the second overvoltage protection apparatus are controlled based upon a comparison between a switching frequency of the device and a predetermine frequency threshold.

In accordance with another embodiment, a method comprises detecting a switching frequency of a wireless power transfer system, in an overvoltage event of the wireless power transfer system, activating a first overvoltage protection apparatus coupled to inputs of a rectifier when the switching frequency is less than a predetermined frequency threshold, and activating a second overvoltage protection apparatus coupled to an output of the rectifier when the switching frequency is greater than the predetermined frequency threshold.

In accordance with yet another embodiment, a system comprises a receiver coil configured to be magnetically coupled to a transmitter coil, a rectifier having a first input connected to a first terminal of the receiver coil and a second input connected to a second terminal of the receiver coil through a capacitor, a first overvoltage protection apparatus connected to the first input and second input of the rectifier, respectively, a second overvoltage protection apparatus connected to an output of the rectifier, and a control apparatus configured to control the first overvoltage protection apparatus and the second overvoltage protection apparatus such that the first overvoltage protection apparatus and the second overvoltage protection apparatus are activated or disabled based upon a comparison between a switching frequency of the system and a predetermine frequency threshold.

An advantage of an embodiment of the present disclosure is an overvoltage protection device in a receiver of a wireless power transfer system for effectively protecting the receiver and electronic devices connected to the receiver from being damaged during overvoltage events.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely an overvoltage protection device in a receiver of a wireless power transfer system. The disclosure may also be applied, however, to a variety of power systems. Hereinafter, various embodiments will be explained in detail with reference to the accompanying drawings.

Figure 1:
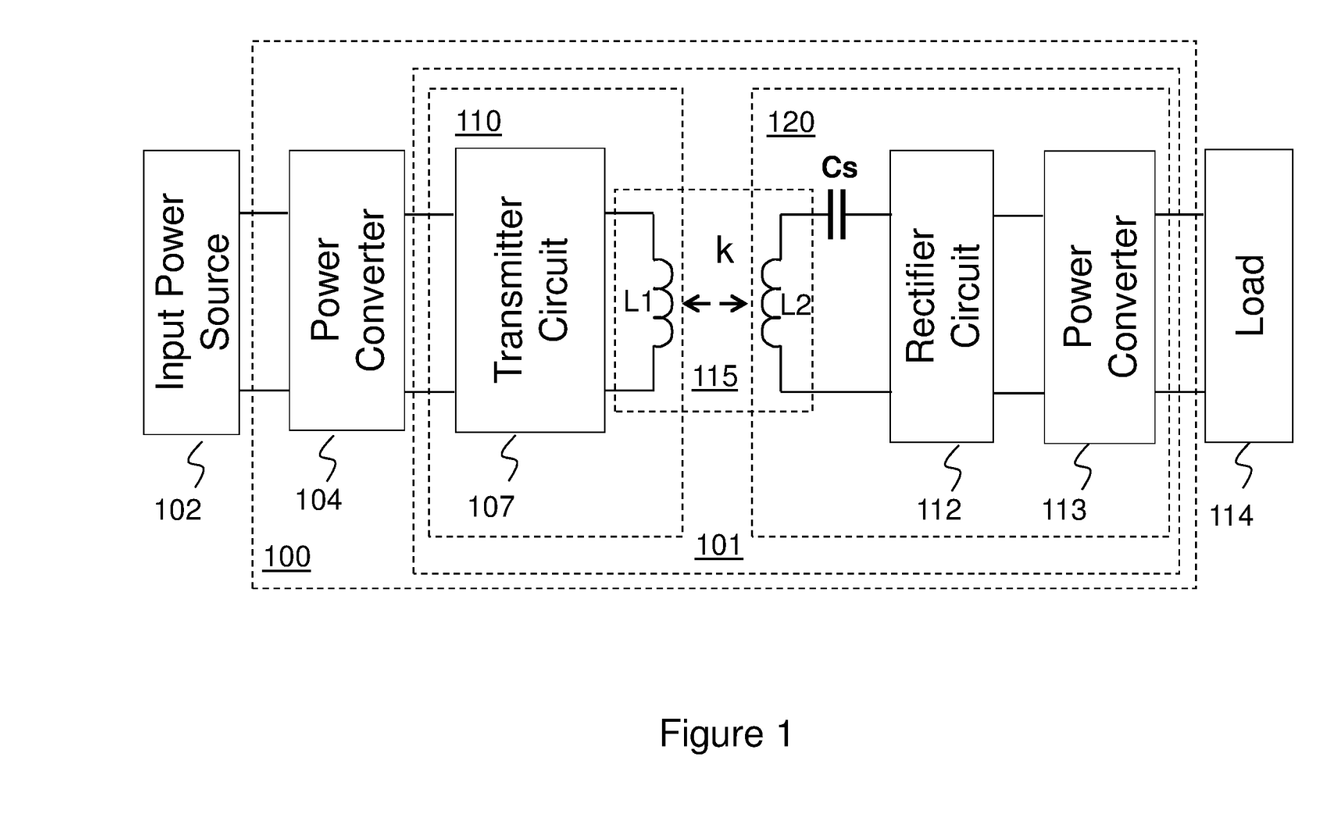
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 comprises a power converter 104 and a wireless power transfer device 101 connected in cascade between an input power source 102 and a load 114. In some embodiments, the power converter 104 is employed to further improve the performance of the wireless power transfer system 100. In alternative embodiments, the power converter 104 is an optional element. In other words, the wireless power transfer device 101 may be connected to the input power source 102 directly.

The wireless power transfer device 101 includes a power transmitter 110 and a power receiver 120. As shown in FIG. 1, the power transmitter 110 comprises a transmitter circuit 107 and a transmitter coil L1 connected in cascade. The input of the transmitter circuit 107 is coupled to an output of the power converter 104. The power receiver 120 comprises a receiver coil L2, a resonant capacitor Cs, a rectifier 112 and a power converter 113 connected in cascade. As shown in FIG. 1, the resonant capacitor Cs is connected in series with the receiver coil L2 and further connected to the inputs of the rectifier 112. The outputs of the rectifier 112 are connected to the inputs of the power converter 113. The outputs of the power converter 113 are coupled to the load 114.

The power transmitter 110 is magnetically coupled to the power receiver 120 through a magnetic field when the power receiver 120 is placed near the power transmitter 110. A loosely coupled transformer 115 is formed by the transmitter coil L1, which is part of the power transmitter 110, and the receiver coil L2, which is part of the power receiver 120. As a result, electrical power may be transferred from the power transmitter 110 to the power receiver 120.

In some embodiments, the power transmitter 110 may be inside a charging pad. The transmitter coil L1 is placed underneath the top surface of the charging pad. The power receiver 120 may be embedded in a mobile phone. When the mobile phone is placed near the charging pad, a magnetic coupling may be established between the transmitter coil L1 and the receiver coil L2. In other words, the transmitter coil L1 and the receiver coil L2 may form a loosely coupled transformer through which a power transfer occurs between the power transmitter 110 and the power receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the power transmitter 110 and the power receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be any suitable energy storage devices such as rechargeable batteries, fuel cells, any combinations thereof and/or the like.

The load 114 represents the power consumed by the mobile device (e.g., a mobile phone) coupled to the power receiver 120. Alternatively, the load 114 may refer to a rechargeable battery and/or batteries connected in series/parallel, and coupled to the output of the power receiver 120. Furthermore, the load 114 may be a downstream power converter such as a battery charger.

The transmitter circuit 107 may comprise primary side switches of a full-bridge converter according to some embodiments. Alternatively, the transmitter circuit 107 may comprise the primary side switches of any other suitable power converters such as a half-bridge converter, a push-pull converter, any combinations thereof and/or the like.

It should be noted that the power converters described above are merely examples. One having ordinary skill in the art will recognize other suitable power converters such as class E topology based power converters (e.g., a class E amplifier), may alternatively be used depending on design needs and different applications.

The transmitter circuit 107 may further comprise a resonant capacitor (not shown). The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The power receiver 120 comprises the receiver coil L2 magnetically coupled to the transmitter coil L1 after the power receiver 120 is placed near the power transmitter 110. As a result, power may be transferred to the receiver coil and further delivered to the load 114 through the rectifier 112. The power receiver 120 may comprise a secondary resonant capacitor Cs as shown in FIG. 1. Throughout the description, the secondary resonant capacitor Cs may be alternatively referred to as a receiver resonant capacitor.

The rectifier 112 converts an alternating polarity waveform received from the resonant tank comprising the receiver coil L2 and the receiver resonant capacitor Cs to a single polarity waveform. In some embodiments, the rectifier 112 comprises a full-wave diode bridge and an output capacitor. In alternative embodiments, the full-wave diode bridge may be replaced by a full-wave bridge formed by switching elements such as n-type metal oxide semiconductor (NMOS) transistors.

Furthermore, the rectifier 112 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 112 are well known in the art, and hence are not discussed herein.

The power converter 113 is coupled between the rectifier 112 and the load 114. The power converter 113 is a non-isolated power converter. In some embodiments, the power converter 113 is implemented as a step-down power converter such as a buck converter. In alternative embodiments, the power converter 113 is implemented as a four-switch buck-boost power converter.

Furthermore, the power converter 113 may be implemented as a hybrid power converter. The hybrid converter is a non-isolated power converter. By controlling the on/off of the switches of the hybrid converter, the hybrid converter can be configured as a buck converter, a charge pump converter or a hybrid converter.

Depending design needs and different applications, the hybrid converter may operate in different operating modes. More particularly, the hybrid converter may operate in a buck mode when the load current is less than a predetermined current threshold and/or the input voltage is less than a predetermined voltage threshold. In the buck mode, the hybrid converter is configured as a buck converter. The hybrid converter may operate in a charge pump mode or a hybrid mode when the input voltage is greater than the predetermined voltage threshold and/or the load current is greater than the predetermined current threshold. More particularly, in some embodiments, the hybrid converter may operate in a charge pump mode or a hybrid mode when a ratio of the output voltage of the hybrid converter to the input voltage of the hybrid converter is less than 0.5. In the charge pump mode, the hybrid converter is configured as a charge pump converter. In the hybrid mode, the hybrid converter is configured as a hybrid converter.

In some embodiments, the hybrid converter comprises a first switch, a capacitor and a second switch connected in series between the output of the rectifier 112 and the input of the load 114. The hybrid converter further comprises a third switch and a fourth switch. The third switch is connected between a common node of the first switch and the capacitor, and a common node of the second switch and the output terminal of the hybrid converter. The fourth switch is connected between a common node of the capacitor and the second switch, and ground.

Moreover, the power converter 113 may comprise a first power stage and a second power stage connected in cascade. The first power stage is configured to operate in different modes for efficiently charging the load 114 (e.g., a rechargeable battery). In some embodiments, the first stage may be implemented as a step-down power converter (e.g., a buck converter), a four-switch buck-boost converter, a hybrid converter and any combinations thereof. The second power stage is configured as a voltage divider or an isolation switch.

Figure 2:
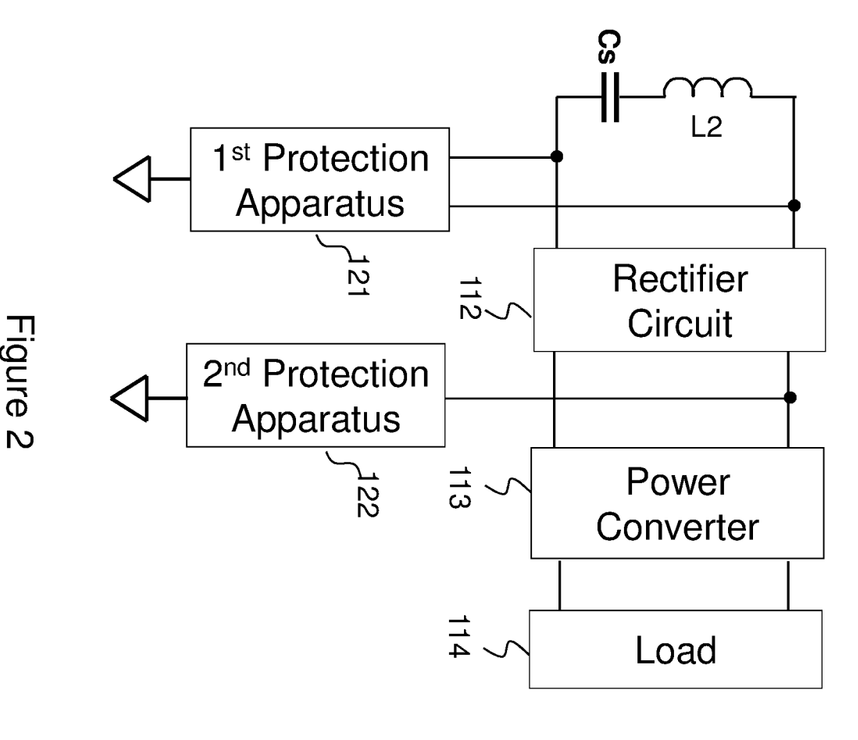
FIG. 2 illustrates a block diagram of the receiver shown in FIG. 1 in accordance with various embodiments of the present disclosure.

FIG. 2 illustrates a block diagram of the receiver shown in FIG. 1 in accordance with various embodiments of the present disclosure. As shown in FIG. 2, the receiver coil L2 and the receiver resonant capacitor Cs are connected in series. The receiver coil L2 is configured to be magnetically coupled to a transmitter coil (not shown). The receiver resonant capacitor Cs and the receiver coil L2 form a receiver resonant tank.

The two inputs of the rectifier 112 are connected to the receiver coil L2 and the receiver resonant capacitor Cs respectively. The outputs of the rectifier 112 are connected to the inputs of the power converter 113. The outputs of the power converter 113 are connected to the load 114.

As shown in FIG. 2, a first overvoltage protection apparatus 121 is connected between the inputs of the rectifier 112 and ground. More particularly, the first overvoltage protection apparatus 121 has two terminals connected to the two input terminals of the rectifier 112 respectively. A second overvoltage protection apparatus 122 is connected between the output of the rectifier 112 and ground. The detailed schematic diagram of the first overvoltage protection apparatus 121 and the second overvoltage protection apparatus 122 will be described below with respect to FIG. 2.

In operation, a switching frequency of the receiver is detected and compared with a predetermined switch frequency threshold. During an overvoltage event, in some embodiments, the first overvoltage protection apparatus 121 is activated and the second overvoltage protection apparatus 122 is disabled when the switching frequency is less than the predetermined switching frequency threshold. On the other hand, the second overvoltage protection apparatus 122 is activated and the first overvoltage protection apparatus 121 is disabled when the switching frequency is greater than the predetermined switching frequency threshold.

In alternative embodiments, both the first overvoltage protection apparatus 121 and the second overvoltage protection apparatus 122 are activated when the switching frequency is less than the predetermined switching frequency threshold. On the other hand, the second overvoltage protection apparatus 122 is activated and the first overvoltage protection apparatus 121 is disabled when the switching frequency is greater than the predetermined switching frequency threshold.

Furthermore, during an overvoltage event, the first overvoltage protection apparatus 121 is activated and the second overvoltage protection apparatus 122 is activated in a controllable manner when the switching frequency is less than the predetermined switching frequency threshold. On the other hand, the second overvoltage protection apparatus 122 is activated and the first overvoltage protection apparatus 121 is disabled when the switching frequency is greater than the predetermined switching frequency threshold. The detailed implementation of activating the second overvoltage protection apparatus 122 in a controllable manner will be described below with respect to FIG. 6.

Figure 3:
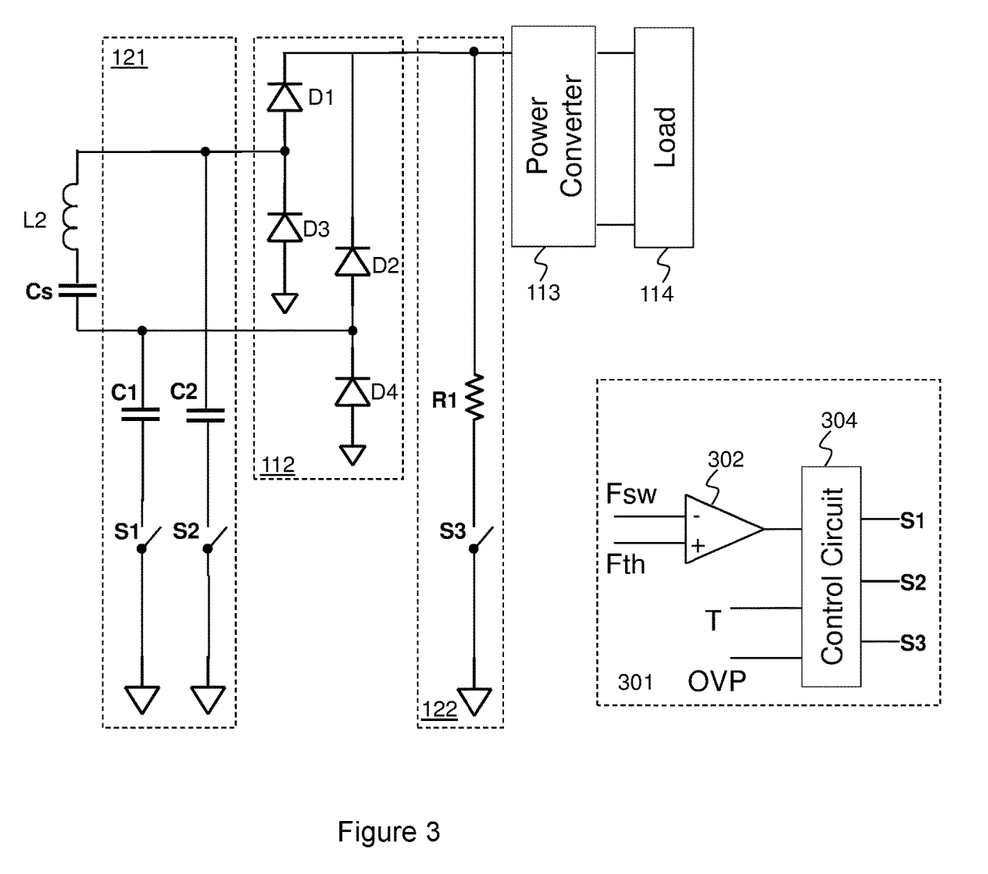
FIG. 3 illustrates a schematic diagram of the overvoltage protection device shown in FIG. 2 in accordance with various embodiments of the present disclosure.

FIG. 3 illustrates a schematic diagram of the overvoltage protection device of the receiver shown in FIG. 2 in accordance with various embodiments of the present disclosure. The receiver comprises the receiver coil L2, the receiver resonant capacitor Cs, the rectifier 112 and the power converter 113. As shown in FIG. 3, the receiver resonant capacitor Cs, the rectifier 112 and the power converter 113 are connected in cascade between the receiver coil L2 and the load 114.

The receiver further comprises the first overvoltage protection apparatus 121, the second overvoltage protection apparatus 122 and a control apparatus 301. Both the first overvoltage protection apparatus 121 and the second overvoltage protection apparatus 122 are employed to protect the receiver from being damaged during an overvoltage event. The control apparatus 301 is employed to control the operation of the first overvoltage protection apparatus 121 and the second overvoltage protection apparatus 122 based upon different operating parameters such as the switching frequency of the receiver.

In some embodiments, the rectifier 112 is implemented as a full-wave rectifier. In some embodiments, the rectifier 112 includes four diodes, namely D1, D2, D3 and D4. As shown in FIG. 3, the diodes D1 and D3 are connected in series between the output terminal of the rectifier 112 and ground. Likewise, the diodes D2 and D4 are connected in series between the output terminal of the rectifier 112 and ground. As shown in FIG. 3, the common node of the diodes D1 and D3 is coupled to the receiver coil L2. The common node of the diodes D2 and D4 is coupled to the receiver resonant capacitor Cs.

In alternative embodiments, the rectifier 112 may include four switching elements. The connection of the four switching elements is similar to that of the diode rectifier shown in FIG. 3, and hence is not discussed again herein.

According to some embodiments, the switching elements of the rectifier 112 are implemented as MOSFET or MOSFETs connected in parallel, any combinations thereof and/or the like. According to alternative embodiments, the switching elements may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full-wave rectifier (e.g., full-wave rectifier 112 shown in FIG. 3), the implementation of the receiver shown in FIG. 3 may have many variations, alternatives, and modifications. For example, half-wave rectifiers may be alternatively employed.

In sum, the full-wave rectifier 112 illustrated herein is limited solely for the purpose of clearly illustrating the inventive aspects of the various embodiments. The present disclosure is not limited to any particular power topology.

The first overvoltage protection apparatus 121 comprises a first capacitor C1 and a first switch S1 connected in series between a first input of the rectifier and ground. As shown in FIG. 3, the first input of the rectifier 112 is the common node of the diodes D2 and D4. As shown in FIG. 3, the first overvoltage protection apparatus 121 further comprises a second capacitor C2 and a second switch S2 connected in series between a second input of the rectifier 112 and ground. As shown in FIG. 3, the second input of the rectifier 112 is the common node of the diodes D1 and D3.

In operation, both the first switch S1 and the second switch S2 are turned off when there is no overvoltage condition. On the other hand, under an overvoltage event, the switches S1 and S2 may be turned on. As a result of turning on switches S1 and S2, the first capacitor C1 and the second capacitor C2 help to change the impedance of the receiver, thereby reducing the received power as well as the voltage across the output of the rectifier 112.

The second overvoltage protection apparatus 122 comprises a resistor R1 and a third switch S3 connected in series between the output of the rectifier 112 and ground. The resistor R1 is implemented as a power resistor. In operation, the third switch S3 is turned off when there is no overvoltage condition. On the other hand, under an overvoltage event, the third switch S3 may be turned on. As a result of turning on the third switch S3, the resistor R1 shunts the unexpected power, thereby reducing the voltage across the output of the rectifier 112.

It should be noted the operation of the first overvoltage protection apparatus 121 and the second overvoltage protection apparatus 122 is controlled by the control apparatus 301. As shown in FIG. 3, the control apparatus 301 comprises a comparator 302 and a control circuit 304. In some embodiments, the comparator 302 is implemented as a comparator with suitable hysteresis. The hysteresis of the comparator 302 helps to make smooth transitions between the first overvoltage protection apparatus 121 and the second overvoltage protection apparatus 122 (e.g., activating one protection apparatus and disable the other protection apparatus).

As shown in FIG. 3, the inverting input of the comparator 302 is configured to receive the switching frequency signal of the receiver. More particularly, a sensing apparatus (not shown) is used to detect the switching frequency of the current/voltage of the receiver coil L2 and generate the switching frequency signal. The switching frequency signal is fed into the comparator 302. The non-inverting input of the comparator 302 is configured to receive a predetermined switching frequency threshold. In some embodiments, the predetermined switching frequency threshold is about 150 KHz.

The control circuit 304 is configured to receive the comparison result of the comparator 302 and other suitable operating parameters such as the temperature of the resistor R1, the overvoltage event trigger signal and the like. Based upon the received signals, the control circuit 304 determines the on/off of the switches S1, S2 and S3. In other words, the control circuit 304 is employed to generate protection control mechanisms based upon the received signals. The detailed protection control mechanisms will be described below with respect to FIGS. 4-6.

Figure 4:
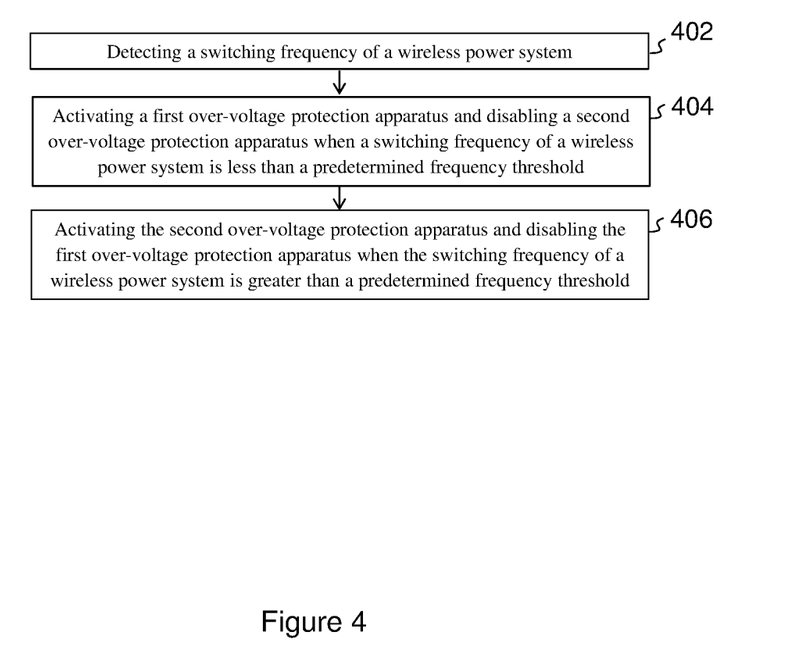
FIG. 4 illustrates a flow chart of applying a first overvoltage protection control mechanism to the receiver shown in FIG. 3 in accordance with various embodiments of the present disclosure.

FIG. 4 illustrates a flow chart of applying a first overvoltage protection control mechanism to the receiver shown in FIG. 3 in accordance with various embodiments of the present disclosure. This flowchart shown in FIG. 4 is merely an example, which should not unduly limit the scope of the claims. One of ordinary skill in the art would recognize many variations, alternatives, and modifications. For example, various steps illustrated in FIG. 4 may be added, removed, replaced, rearranged and repeated.

At step 402, a switching frequency of a wireless power system is detected by a suitable sensing apparatus or a plurality of sensing devices. The detected switching frequency is processed by a controller. In particular, the detected switching frequency is compared with a predetermined switching frequency threshold.

The receiver of the wireless power system comprises a first overvoltage protection apparatus 121 and a second overvoltage protection apparatus 122 as shown in FIG. 3. The first overvoltage protection apparatus 121 comprises two controllable switch-capacitor networks. The second overvoltage protection apparatus 122 comprises a controllable power resistor.

At step 404, during an overvoltage event, the first overvoltage protection apparatus 121 is activated and the second overvoltage protection apparatus 122 is disabled when the switching frequency is less than the predetermined switching frequency threshold.

At step 406, during the overvoltage event, the second overvoltage protection apparatus 122 is activated and the first overvoltage protection apparatus 121 is disabled when the switching frequency is greater than the predetermined switching frequency threshold.

Figure 5:
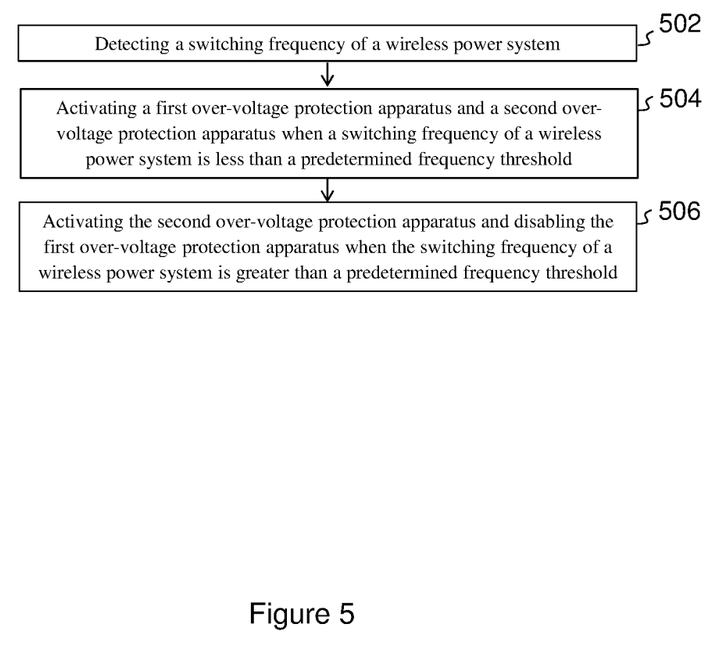
FIG. 5 illustrates a flow chart of applying a second overvoltage protection control mechanism to the receiver shown in FIG. 3 in accordance with various embodiments of the present disclosure.

FIG. 5 illustrates a flow chart of applying a second overvoltage protection control mechanism to the receiver shown in FIG. 3 in accordance with various embodiments of the present disclosure. This flowchart shown in FIG. 5 is merely an example, which should not unduly limit the scope of the claims. One of ordinary skill in the art would recognize many variations, alternatives, and modifications. For example, various steps illustrated in FIG. 5 may be added, removed, replaced, rearranged and repeated.

At step 502, a switching frequency of a wireless power system is detected by a suitable sensing apparatus or a plurality of sensing devices. The detected switching frequency is processed by a controller. In particular, the detected switching frequency is compared with a predetermined switching frequency threshold.

The receiver of the wireless power system comprises a first overvoltage protection apparatus 121 and a second overvoltage protection apparatus 122 as shown in FIG. 3. The first overvoltage protection apparatus 121 comprises two controllable switch-capacitor networks. The second overvoltage protection apparatus 122 comprises a controllable power resistor.

At step 504, under an overvoltage event, both the first overvoltage protection apparatus 121 and the second overvoltage protection apparatus 122 are activated when the switching frequency is less than the predetermined switching frequency threshold.

At step 506, under the overvoltage event, the second overvoltage protection apparatus 122 is activated and the first overvoltage protection apparatus 121 is disabled when the switching frequency is greater than the predetermined switching frequency threshold.

One advantageous feature of activating the second overvoltage protection apparatus 122 when the switching frequency is greater than the predetermined switching frequency threshold is that a relatively small power resistor can achieve the overvoltage protection function because the received power at the high frequency operation is low. The relatively small power resistor can shunt the power, thereby reducing the voltage at the output of the rectifier. In some embodiments, the resistor R1 of the second overvoltage protection apparatus 122 is implemented as a power resistor. The power resistor is a 100 Ohm resistor rated for about 2 W.

Figure 6:
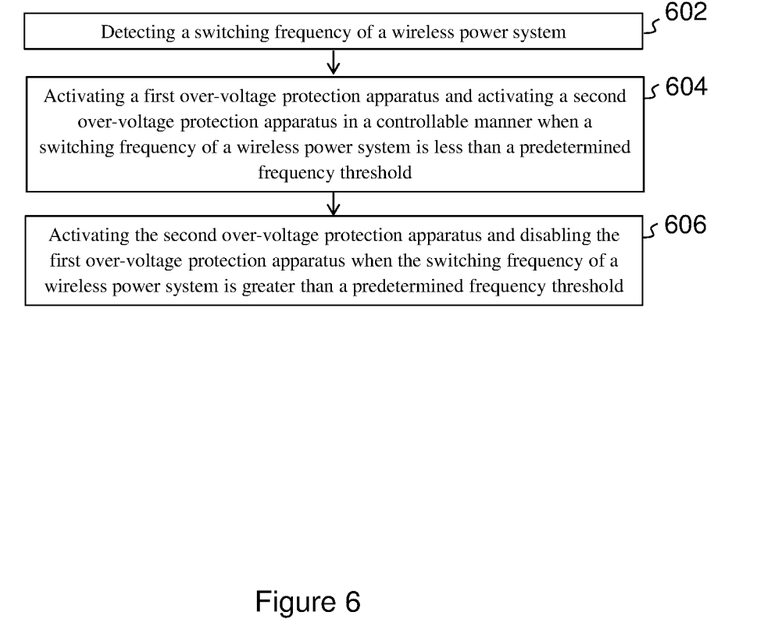
FIG. 6 illustrates a flow chart of applying a third overvoltage protection control mechanism to the receiver shown in FIG. 3 in accordance with various embodiments of the present disclosure.

FIG. 6 illustrates a flow chart of applying a third overvoltage protection control mechanism to the receiver shown in FIG. 3 in accordance with various embodiments of the present disclosure. This flowchart shown in FIG. 6 is merely an example, which should not unduly limit the scope of the claims. One of ordinary skill in the art would recognize many variations, alternatives, and modifications. For example, various steps illustrated in FIG. 6 may be added, removed, replaced, rearranged and repeated.

At step 602, a switching frequency of a wireless power system is detected by a suitable sensing apparatus or a plurality of sensing devices. The detected switching frequency is processed by a controller. In particular, the detected switching frequency is compared with a predetermined switching frequency threshold.

The receiver of the wireless power system comprises a first overvoltage protection apparatus 121 and a second overvoltage protection apparatus 122 as shown in FIG. 3. The first overvoltage protection apparatus 121 comprises two controllable switch-capacitor networks. The second overvoltage protection apparatus 122 comprises a controllable power resistor.

At step 604, the first overvoltage protection apparatus 121 is activated and the second overvoltage protection apparatus 122 is activated in a controllable manner when the switching frequency is less than the predetermined switching frequency threshold.

The second overvoltage protection apparatus 122 may be controlled by other operating parameters such as the temperature of the resistor R1. In operation, a temperature of the second overvoltage protection apparatus 122 is detected by suitable temperature sensing devices. The second overvoltage protection apparatus 122 may be temporarily disabled when the temperature of the second overvoltage protection apparatus 122 is greater than a predetermined temperature threshold. In other words, the second overvoltage protection apparatus is controlled by both the switching frequency and the temperature.

One advantageous feature of configuring the second overvoltage protection apparatus 122 to operate in a controllable manner is that the temperature control mechanism described above helps to improve the reliability of the receiver of the wireless power transfer system.

At step 606, the second overvoltage protection apparatus 122 is activated and the first overvoltage protection apparatus 121 is disabled when the switching frequency is greater than the predetermined switching frequency threshold.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:
1. A device comprising:
a rectifier connected to a receiver coil;
a first overvoltage protection apparatus connected between inputs of the rectifier and ground; and
a second overvoltage protection apparatus connected between an output of the rectifier and ground, wherein in an overvoltage event, the first overvoltage protection apparatus and the second overvoltage protection apparatus are controlled based upon a comparison between a switching frequency of the device and a predetermine frequency threshold.

2. The device of claim 1, wherein:
the first overvoltage protection apparatus comprises:
  a first capacitor and a first switch connected in series between a first input of the rectifier and ground; and
  a second capacitor and a second switch connected in series between a second input of the rectifier and ground; and
the second overvoltage protection apparatus comprises a resistor and a third switch connected in series between the output of the rectifier and ground.

3. The device of claim 2, wherein the rectifier comprises:
a first diode and a second diode connected in series between the output of the rectifier and ground; and
a third diode and a fourth diode connected in series between the output of the rectifier and ground.

4. The device of claim 3, wherein:
a common node of the first diode and the second diode is connected to a first terminal of the receiver coil; and
a common node of the third diode and the fourth diode is connected to a second terminal of the receiver coil through a secondary resonant capacitor.

5. The device of claim 1, further comprising:
a control apparatus comprising a comparator and a control circuit, wherein an inverting input of the comparator is configured to receive the switching frequency of the device, and a non-inverting input of the comparator is configured to receive the predetermine frequency threshold.

6. The device of claim 5, wherein:
the control circuit is configured to receive a comparison result generated by the comparator, a temperature signal indicative of a temperature of the second overvoltage protection apparatus and a signal representing the overvoltage event, and generate signals controlling the first overvoltage protection apparatus and the second overvoltage protection apparatus.

7. The device of claim 1, wherein:
in the overvoltage event, the first overvoltage protection apparatus is configured to be activated and the second overvoltage protection apparatus is configured to be disabled when the switching frequency of the device is less than the predetermine frequency threshold; and
the first overvoltage protection apparatus is configured to be disabled and the second overvoltage protection apparatus is configured to be activated when the switching frequency of the device is greater than the predetermine frequency threshold.

8. A method comprising:
detecting a switching frequency of a wireless power transfer system;
in an overvoltage event of the wireless power transfer system, activating a first overvoltage protection apparatus coupled to inputs of a rectifier when the switching frequency is less than a predetermined frequency threshold; and
activating a second overvoltage protection apparatus coupled to an output of the rectifier when the switching frequency is greater than the predetermined frequency threshold.

9. The method of claim 8, wherein the rectifier is in a receiver of the wireless power transfer system, and wherein the receiver comprises a receiver coil, a receiver resonant capacitor, the rectifier, a power converter, the first overvoltage protection apparatus and the second overvoltage protection apparatus, and wherein the rectifier and the power converter are connected in cascade between a receiver resonant tank and a load.

10. The method of claim 9, wherein:
the receiver resonant tank comprises the receiver coil and the receiver resonant capacitor connected in series between a first input of the rectifier and a second input of the rectifier.

11. The method of claim 10, wherein:
the first overvoltage protection apparatus comprises:
  a first capacitor and a first switch connected in series between the first input of the rectifier and ground; and
  a second capacitor and a second switch connected in series between the second input of the rectifier and ground; and
the second overvoltage protection apparatus comprises a resistor and a third switch connected in series between the output of the rectifier and ground.

12. The method of claim 11, further comprising:
comparing the switching frequency with the predetermined frequency threshold using a comparator;
configuring a control circuit to receive a comparison result generated by the comparator, a temperature of the resistor and a signal representing the overvoltage event; and
generating, by the control circuit, a plurality gate drive signals for controlling the first switch, the second switch and the third switch, respectively.

13. The method of claim 11, further comprising:
turning on the first switch and the second switch of the first overvoltage protection apparatus, and turning off the third switch of the second overvoltage protection apparatus when the switching frequency is less than the predetermined frequency threshold; and
turning on the third switch of the second overvoltage protection apparatus, and turning off the first switch and the second switch of the first overvoltage protection apparatus when the switching frequency is greater than the predetermined frequency threshold.

14. The method of claim 11, further comprising:
turning on the first switch and the second switch of the first overvoltage protection apparatus, and the third switch of the second overvoltage protection apparatus when the switching frequency is less than the predetermined frequency threshold; and
turning on the third switch of the second overvoltage protection apparatus and turning off the first switch and the second switch of the first overvoltage protection apparatus when the switching frequency is greater than the predetermined frequency threshold.

15. The method of claim 14, further comprising:
temporarily turning off the third switch of the second overvoltage protection apparatus based on a temperature of the second overvoltage protection apparatus when the switching frequency is less than the predetermined frequency threshold.

16. The method of claim 15, wherein:
the third switch of the second overvoltage protection apparatus is temporarily turned off when the temperature of the second overvoltage protection apparatus is greater than a predetermined temperature threshold.

17. A system comprising:
a receiver coil configured to be magnetically coupled to a transmitter coil;
a rectifier having a first input connected to a first terminal of the receiver coil and a second input connected to a second terminal of the receiver coil through a capacitor;
a first overvoltage protection apparatus connected to the first input and second input of the rectifier, respectively;

a second overvoltage protection apparatus connected to an output of the rectifier; and a control apparatus configured to control the first overvoltage protection apparatus and the second overvoltage protection apparatus such that the first overvoltage protection apparatus and the second overvoltage protection apparatus are activated or disabled based upon a comparison between a switching frequency of the system and a predetermine frequency threshold.

18. The system of claim 17, wherein:

the first overvoltage protection apparatus comprises:
   a first capacitor and a first switch connected in series between the first input of the rectifier and ground; and
   a second capacitor and a second switch connected in series between the second input of the rectifier and ground; and the second overvoltage protection apparatus comprises a resistor and a third switch connected in series between the output of the rectifier and ground.

19. The system of claim 18, wherein:

the first switch and the second switch of the first overvoltage protection apparatus are configured to be turned on, and the third switch of the second overvoltage protection apparatus is configured to be turned off when the switching frequency of the system is less than the predetermine frequency threshold; and the first switch and the second switch of the first overvoltage protection apparatus are configured to be turned off, and the third switch of the second overvoltage protection apparatus is configured to be turned on when the switching frequency of the system is greater than the predetermine frequency threshold.

20. The system of claim 18, wherein:

the first switch and the second switch of the first overvoltage protection apparatus are configured to be turned on, and the third switch of the second overvoltage protection apparatus is configured to be turned on when the switching frequency of the system is less than the predetermine frequency threshold; and the first switch and the second switch of the first overvoltage protection apparatus are configured to be turned off, and the third switch of the second overvoltage protection apparatus is configured to be turned on when the switching frequency of the system is greater than the predetermine frequency threshold.

* * * * *